(12) United States Patent
Murphy

(10) Patent No.: US 9,233,699 B2
(45) Date of Patent: Jan. 12, 2016

(54) HAND TRUCK

(76) Inventor: Jerry Murphy, Mesa, AZ (US)

( * ) Notice: Subject to any disclaimer, the term of this patent is extended or adjusted under 35 U.S.C. 154(b) by 775 days.

(21) Appl. No.: 13/506,745

(22) Filed: May 14, 2012

(65) Prior Publication Data

US 2013/0302120 A1    Nov. 14, 2013

(51) Int. Cl.
     *B62B 1/04*      (2006.01)
     *B62B 1/12*      (2006.01)
     *B62B 1/14*      (2006.01)
     *B62B 1/26*      (2006.01)

(52) U.S. Cl.
     CPC ... *B62B 1/04* (2013.01); *B62B 1/12* (2013.01); *B62B 1/14* (2013.01); *B62B 1/264* (2013.01); *B62B 2202/02* (2013.01); *B62B 2203/10* (2013.01)

(58) Field of Classification Search
     CPC ........ B62B 1/04; B62B 1/12; B62B 2203/10; B62B 3/0612; B62B 3/0625; B62B 1/264; B62B 2202/02; B60P 1/64; B60P 1/025; B60P 1/02; B66F 3/02
     See application file for complete search history.

(56) References Cited

U.S. PATENT DOCUMENTS

| | | | | |
|---|---|---|---|---|
| 507,483 | A * | 10/1893 | Cardarelli | ............... B62B 3/108 193/41 |
| 1,986,620 | A | 1/1935 | Borden et al. | |
| 2,598,489 | A | 5/1952 | Bayer et al. | |
| 2,688,881 | A * | 9/1954 | Crossland | .................... 74/412 R |
| 2,895,567 | A * | 7/1959 | Hall | ............... 187/224 |
| 2,904,201 | A | 9/1959 | Rhodes | |
| 3,052,323 | A | 9/1962 | Hopfeld | |
| 3,156,315 | A | 11/1964 | Hawgood | |
| 3,907,138 | A | 9/1975 | Rhodes | |
| 3,921,958 | A | 11/1975 | Brockelsby et al. | |
| 4,049,083 | A | 9/1977 | Garvey | |
| 4,722,658 | A * | 2/1988 | Wurtz | ..................... B65F 3/045 414/404 |
| 4,728,245 | A | 3/1988 | Shelton | |
| 5,029,884 | A | 7/1991 | Maendel | |
| 5,207,550 | A * | 5/1993 | Lehman | .................. B66F 9/125 414/420 |
| 5,228,716 | A | 7/1993 | Dahl | |
| 5,344,278 | A * | 9/1994 | Emig, Jr. | ................... B62B 3/04 294/119.2 |
| 5,372,470 | A | 12/1994 | Wilke et al. | |
| 5,379,814 | A * | 1/1995 | Posly | ........................ B66F 9/06 141/351 |
| 6,302,377 | B1 * | 10/2001 | Pimentel | ................... B66F 3/02 254/30 |
| 6,398,477 | B1 | 6/2002 | Fox | |
| 6,406,248 | B1 | 6/2002 | McGill et al. | |
| 6,530,740 | B2 | 3/2003 | Kim | |
| 6,561,745 | B2 | 5/2003 | Rountree | |
| 6,929,443 | B1 | 8/2005 | Nellis | |
| 6,971,654 | B2 | 12/2005 | Amsili | |
| 7,137,464 | B2 | 11/2006 | Stahler, Sr. | |
| 7,712,582 | B2 | 5/2010 | Burton et al. | |
| 7,841,603 | B2 | 11/2010 | White | |

(Continued)

*Primary Examiner* — Glenn Myers
(74) *Attorney, Agent, or Firm* — Andrew P. Lahser

(57) ABSTRACT

A hand truck having a frame two short and two long sides; a wheel and axel assembly attached to the frame; a lifting assembly extending between the two short sides; said lifting assembly comprising a frame center pole rail having an attached gear rack, a gear box movably attached to the center pole, said gear box including, a toothed that meshes with the gear rack, a worm gear having a drive shaft that meshes with the toothed pinion, wherein rotation of the drive shaft causes the worm gear to drive the pinion along the gear rack; a lift bracket attached to the gear box comprising a receiving plate with at least one slot; and at least one removable lift platform comprising a platform plate with at least one key that is securely receivable into the slot; wherein the gearbox is drivable using a power supply supplied by a user.

7 Claims, 14 Drawing Sheets

(56) References Cited

U.S. PATENT DOCUMENTS

| | | |
|---|---|---|
| 7,914,017 B2 | 3/2011 | Setzer, Sr. et al. |
| 2001/0038786 A1 | 11/2001 | Kim |
| 2003/0049116 A1* | 3/2003 | Henning ............... B66F 9/22 414/667 |
| 2004/0076501 A1 | 4/2004 | McGill et al. |
| 2005/0110232 A1 | 5/2005 | DiBenedetto |
| 2005/0169736 A1* | 8/2005 | Decky ...................... 414/490 |
| 2007/0152413 A1* | 7/2007 | White ...................... 280/47.29 |
| 2009/0285659 A1* | 11/2009 | Wilson ................ B62B 3/04 414/444 |
| 2011/0243696 A1* | 10/2011 | DiBenedetto ............ 414/490 |
| 2012/0055122 A1* | 3/2012 | Beauchamp ................ 53/492 |
| 2013/0181418 A1* | 7/2013 | Burton et al. ............ 280/47.19 |
| 2013/0270785 A1* | 10/2013 | Whinnery ............ B62B 1/12 280/47.29 |

\* cited by examiner

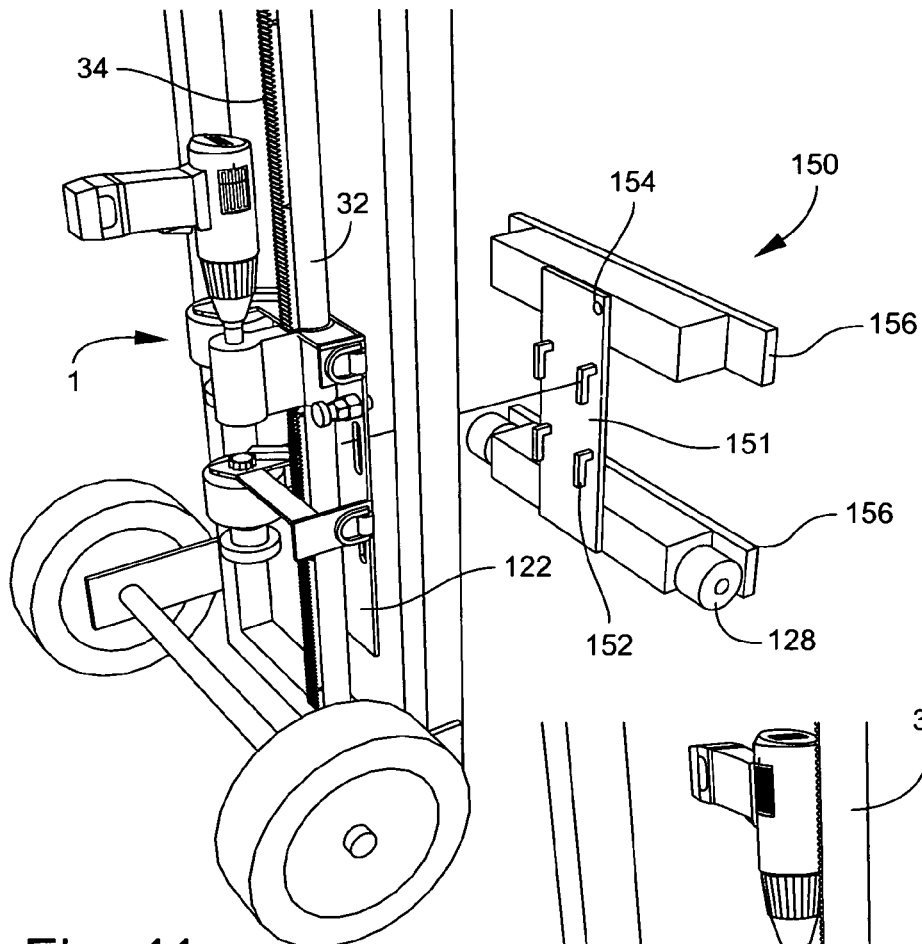
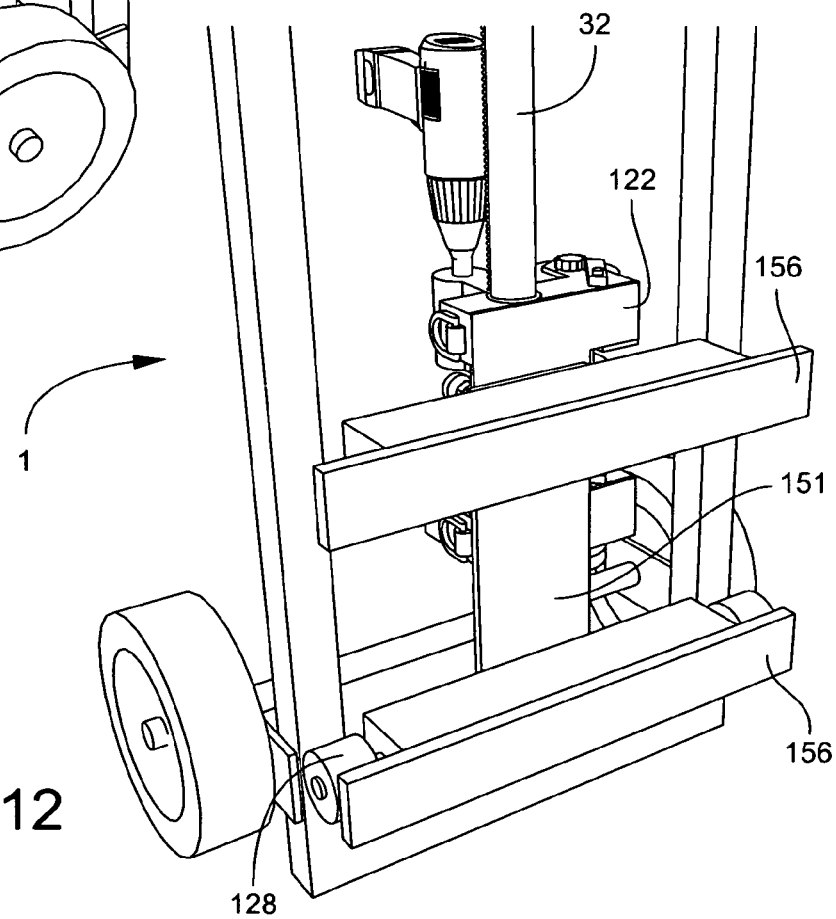
Fig. 11
Fig. 12

HAND TRUCK

FIELD OF THE INVENTION

The present invention relates to a hand truck. More specifically, the hand truck of the present invention includes a powered lifting/lowering feature.

BACKGROUND

Hand trucks are well known devices used for the manual transportation of heavy loads from one location to another location. The most common hand truck has a generally L-shaped body with wheels at the vertex of the L-shaped body and at least one handle located either around a midpoint of the L-shape or near the top of the L-shape. The short leg of the L-shape is the load bearing portion of the hand truck, with the short let typically level with a support surface when the hand truck is upright. An object to be moved is tilted forward, the short leg is inserted underneath such object, the object is then allowed to tilt back and rest on the short leg. Then the hand truck, with supported object, is tilted backward until the center of gravity of the combination is generally balanced over the wheels, making otherwise bulky and heavy objects easier to move.

Improvements to such hand-propelled vehicles have been developed over the years. One improvement relates to providing powered lifting, lowering and transporting features. One example of such a prior art device is disclosed in U.S. Pat. No. 6,530,740 issued to Kim on Mar. 11, 2003. Kim teaches a hand truck with an electrically operated lifting platform. While Kim is an improvement over the prior art hand-propelled vehicles, the Kim hand truck does not fully address several problems related to providing a powered hand truck device with powered features; some of which are discussed below. In addition, Kim provides no teachings related to associating an electronic module for providing automatic features to such the system (as described later).

Thus there is a current need for new handtrucks.

SUMMARY OF THE INVENTION

Some of the objects and advantages of the invention will now be set forth in the following description, while other objects and advantages of the invention may be obvious from the description, or may be learned through practice of the invention.

Broadly speaking, a principle object of the present invention is to provide a portable apparatus for manually transporting items with a powered lifting and lowering feature.

Another object of the invention is to provide a portable apparatus for manually transporting items comprising a powered lifting and lowering feature, wherein said apparatus comprises a removably attachable motor, such as a hand drill or the like.

It is yet another object of the present invention is to provide a hand truck for moving heavy or bulky objects comprising: a frame having two short sides and two long sides; a wheel and axel assembly attached to the frame; a lifting assembly located an intermediate position between the two long sides and extending between the two short sides; said lifting assembly comprising: a frame center pole rail having a gear rack attached thereto, a gear box movably attached to the center pole, said gear box including, a toothed pinion, located in the movable gear box, mounted on a shaft in the gear box and meshing with the gear rack of the center pole, a worm gear that meshes with the toothed pinion, said worm gear including a drive shaft, wherein rotation of the drive shaft causes the worm gear to drive the pinion along the gear rack; a lift bracket comprising a receiving plate with at least one slot; and at least one removable lift platform comprising a platform plate with at least one key that are securely receivable into the slot of the lift bracket receiving plate.

It is yet another object of the present invention to provide the above hand truck wherein the gearbox is drivable using a power supply supplied by a user.

It is yet another object of the present invention to provide the above hand truck further comprising an aperture located in the platform plate and a locking mechanism located on the lift bracket receiving plate and receivable by the aperture located in the platform plate.

It is yet another object of the present invention to provide the above hand truck wherein at least one of the at least one removable lift platform includes a lift platform attached to a bottom edge of the platform plate.

It is yet another object of the present invention to provide the above hand truck wherein at least one of the at least one removable lift platform includes a pair of lift bumpers attached at a top end and a bottom end of the platform plate.

It is yet another object of the present invention to provide the above hand truck wherein at least one of the at least one removable lift platform includes a pair of lift cradles attached at a top end and a bottom end of the platform plate.

It is yet another object of the present invention to provide the above hand truck wherein at least one of the at least one removable lift platform includes a lift platform attached to a bottom edge of the platform plate, at least one of the at least one removable lift platform includes a pair of lift cradles attached at a top end and a bottom end of the platform plate, and at least one of the at least one removable lift platform includes a pair of lift cradles attached at a top end and a bottom end of the platform plate.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any

BRIEF DESCRIPTION OF THE DRAWINGS

FIG. 11 is an exploded view showing a second embodiment of the lifting platform separated from the hand truck of the present invention.

FIG. 12 is a front perspective view of the second embodiment of the lifting platform attached to the hand truck according to the present invention.

DESCRIPTION OF PREFERRED EMBODIMENTS

Figure 1:
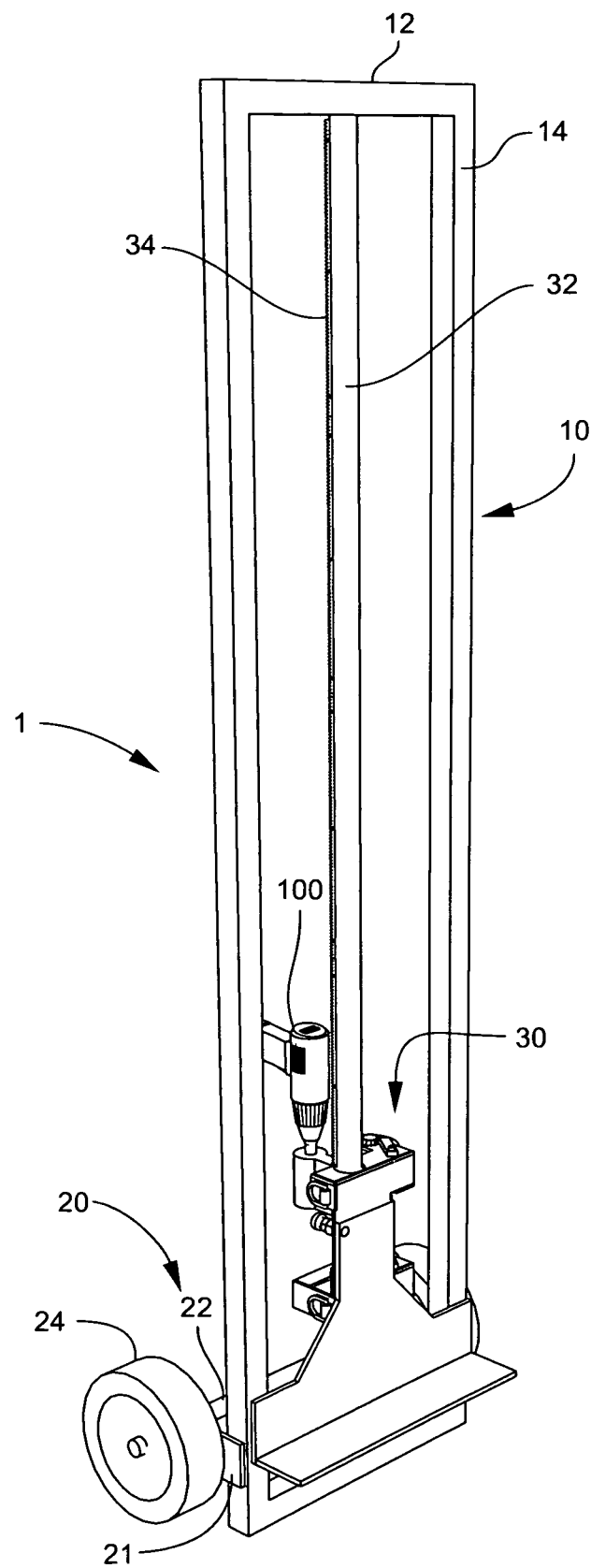
FIG. 1 illustrates one embodiment of the present invention.
Figure 2:
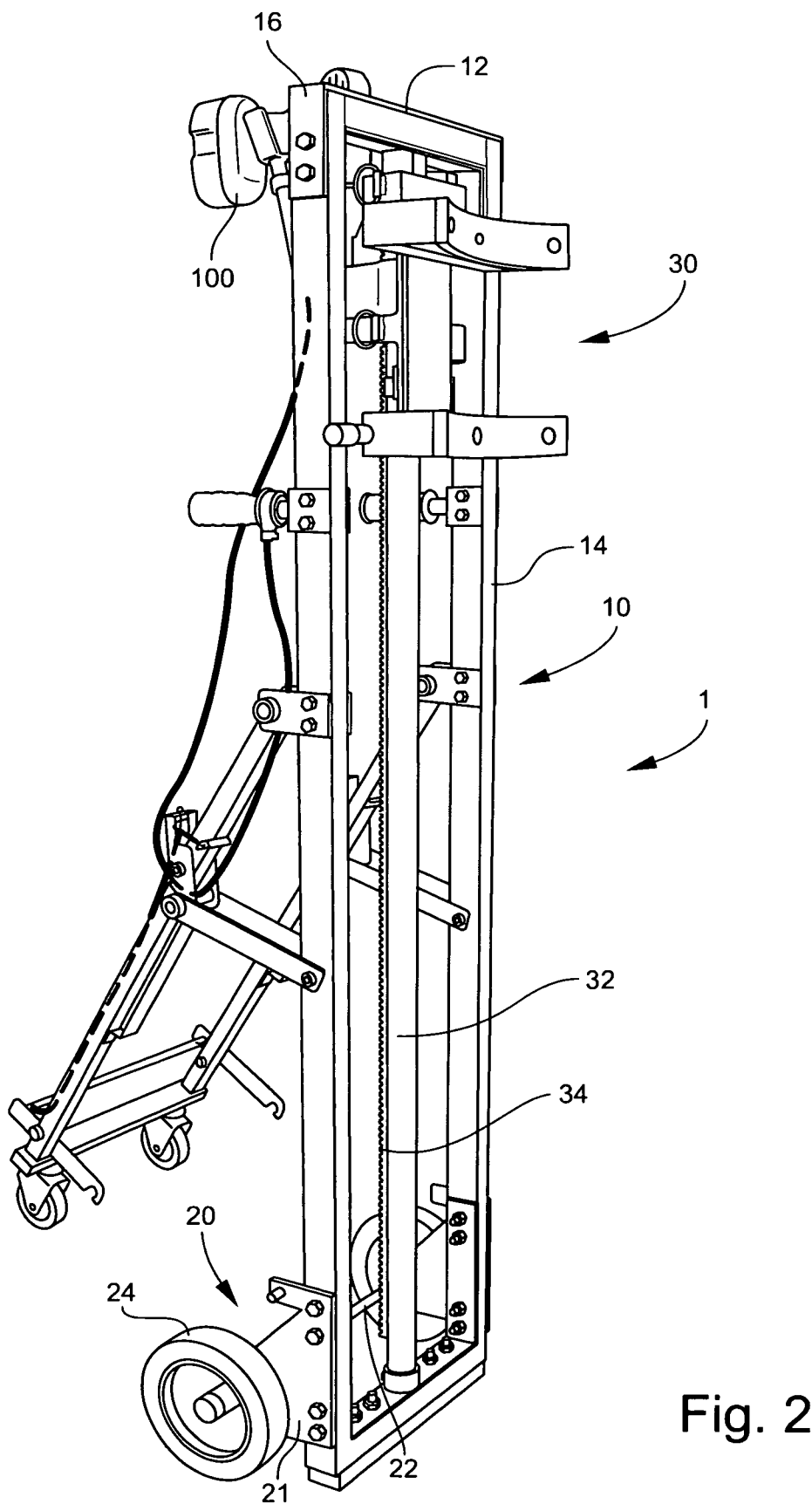
FIG. 2 illustrates a second embodiment of the present invention.
Figure 3:
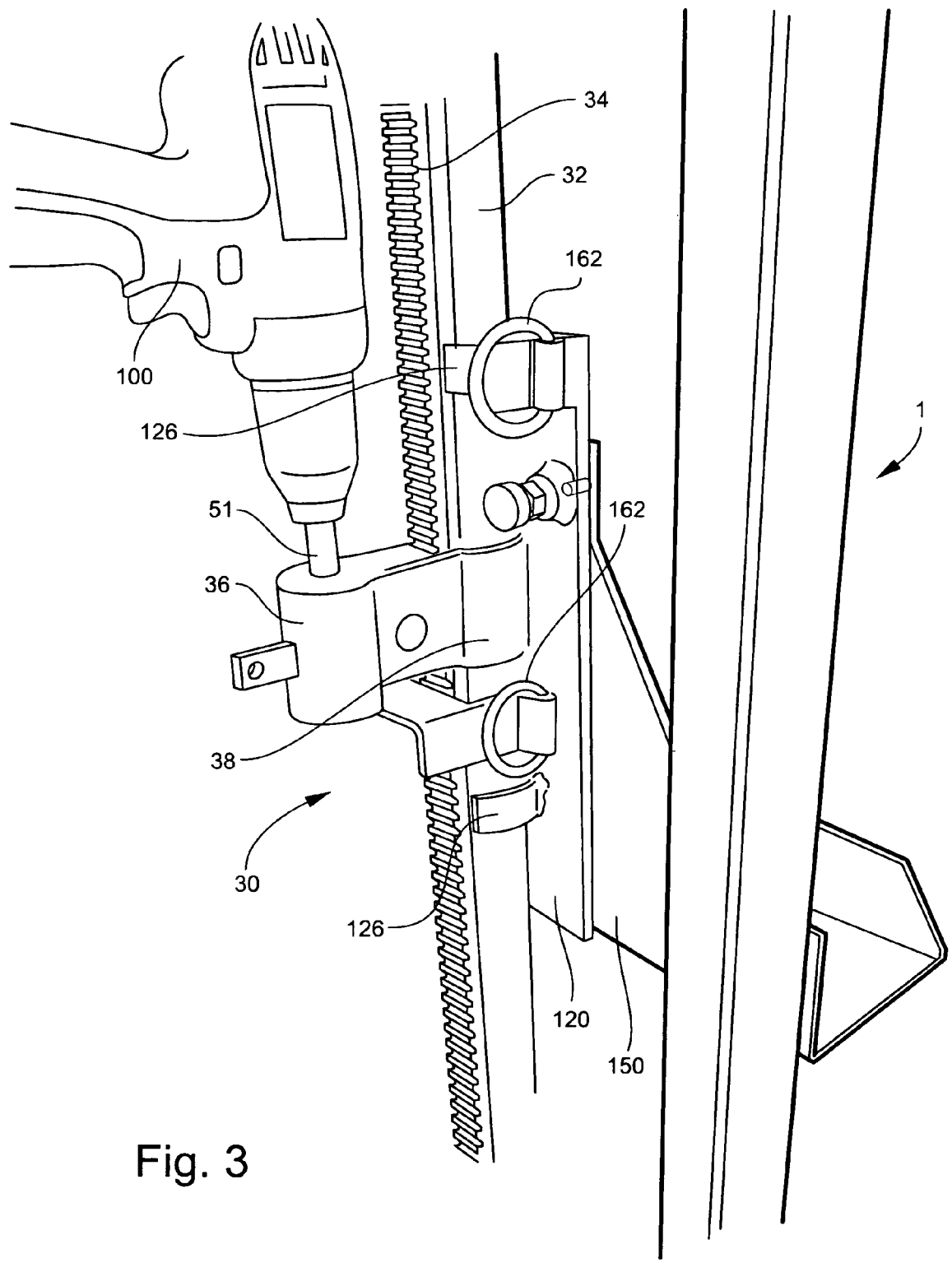
FIG. 3 illustrates the drive mechanism of the present invention.
Figure 4:
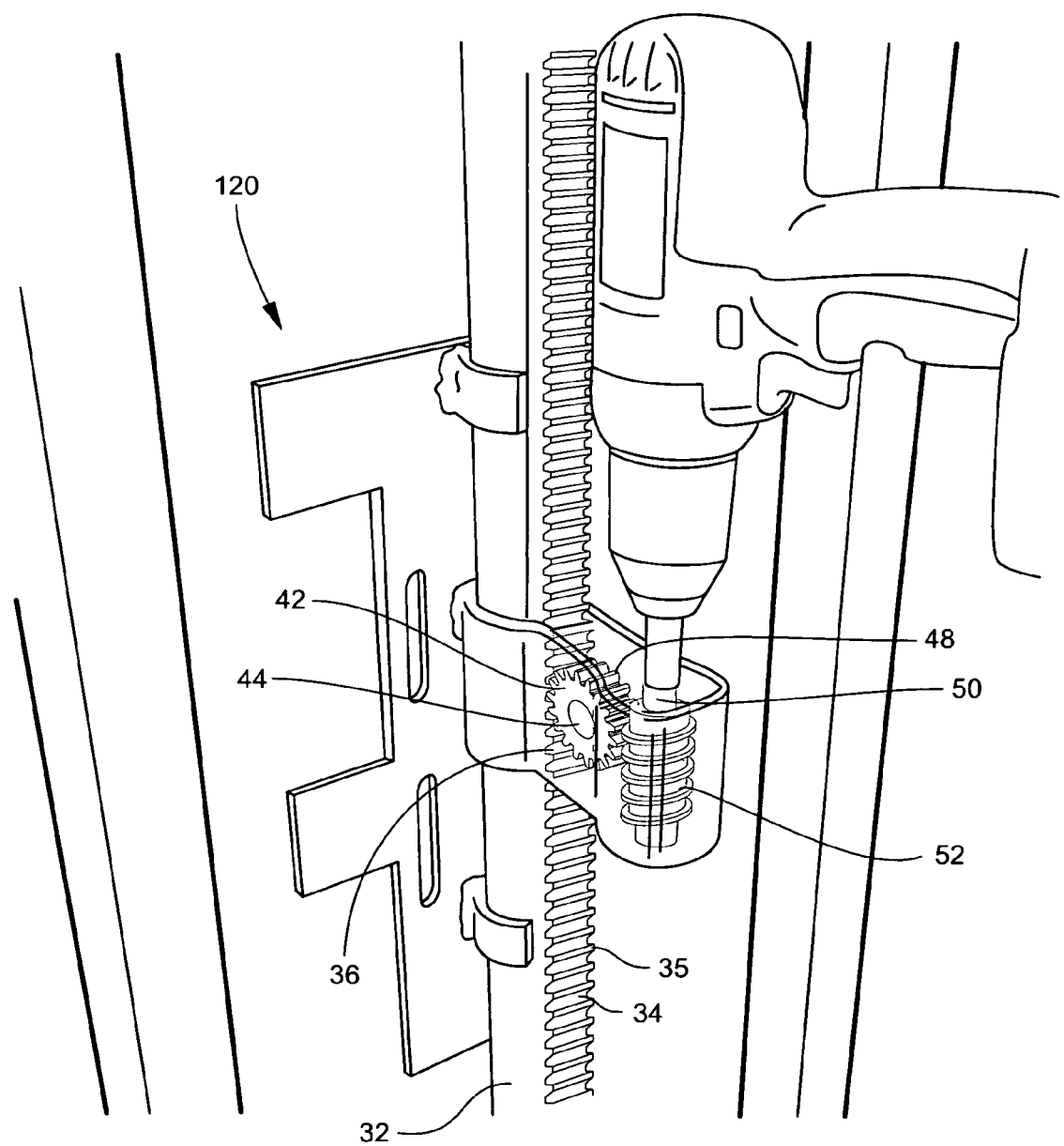
FIG. 4 illustrates the inner elements of the drive mechanism of the present invention.
Figure 5:
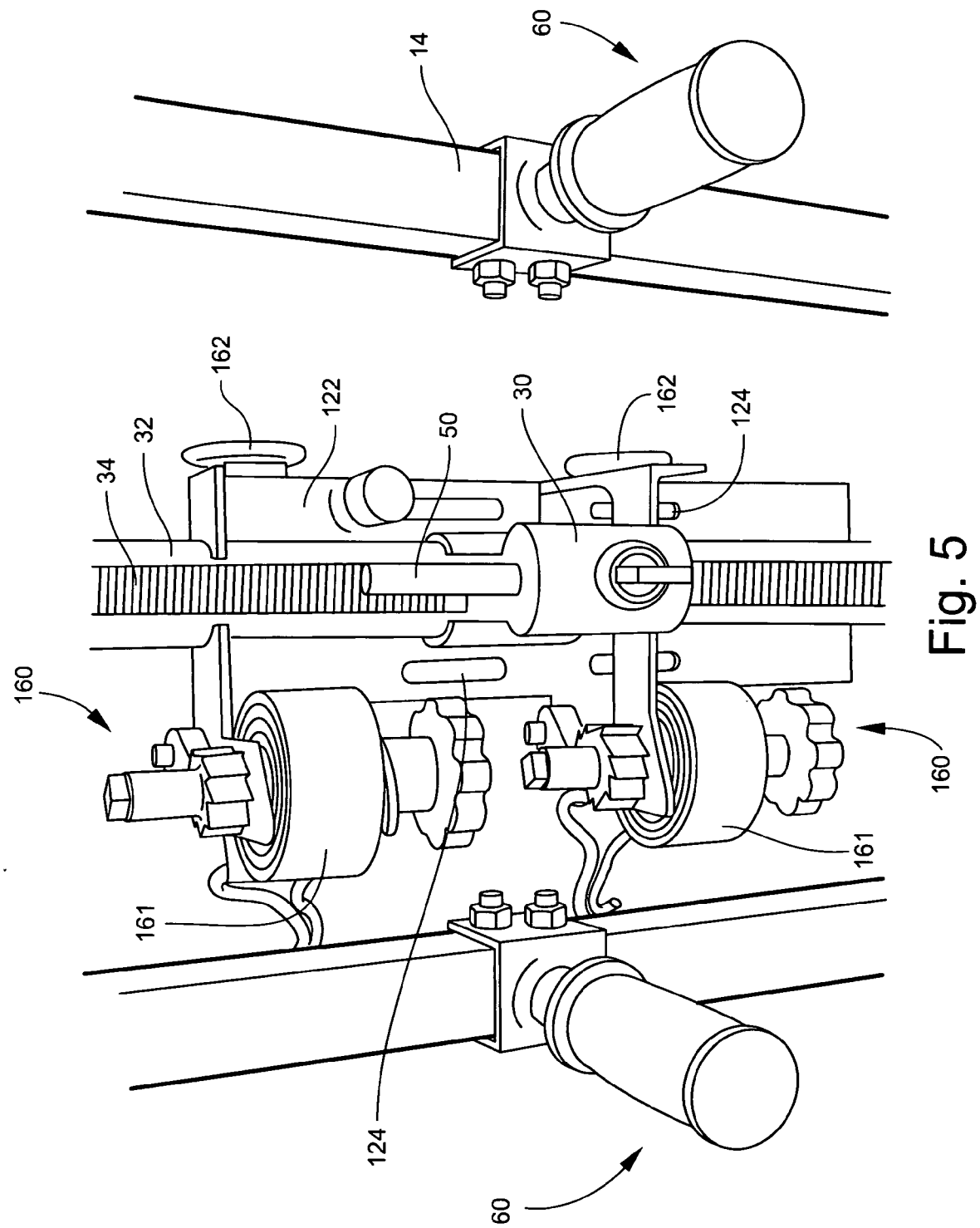
FIG. 5 illustrates the strap, drive, and handle mechanisms of the present invention.
Figure 6:
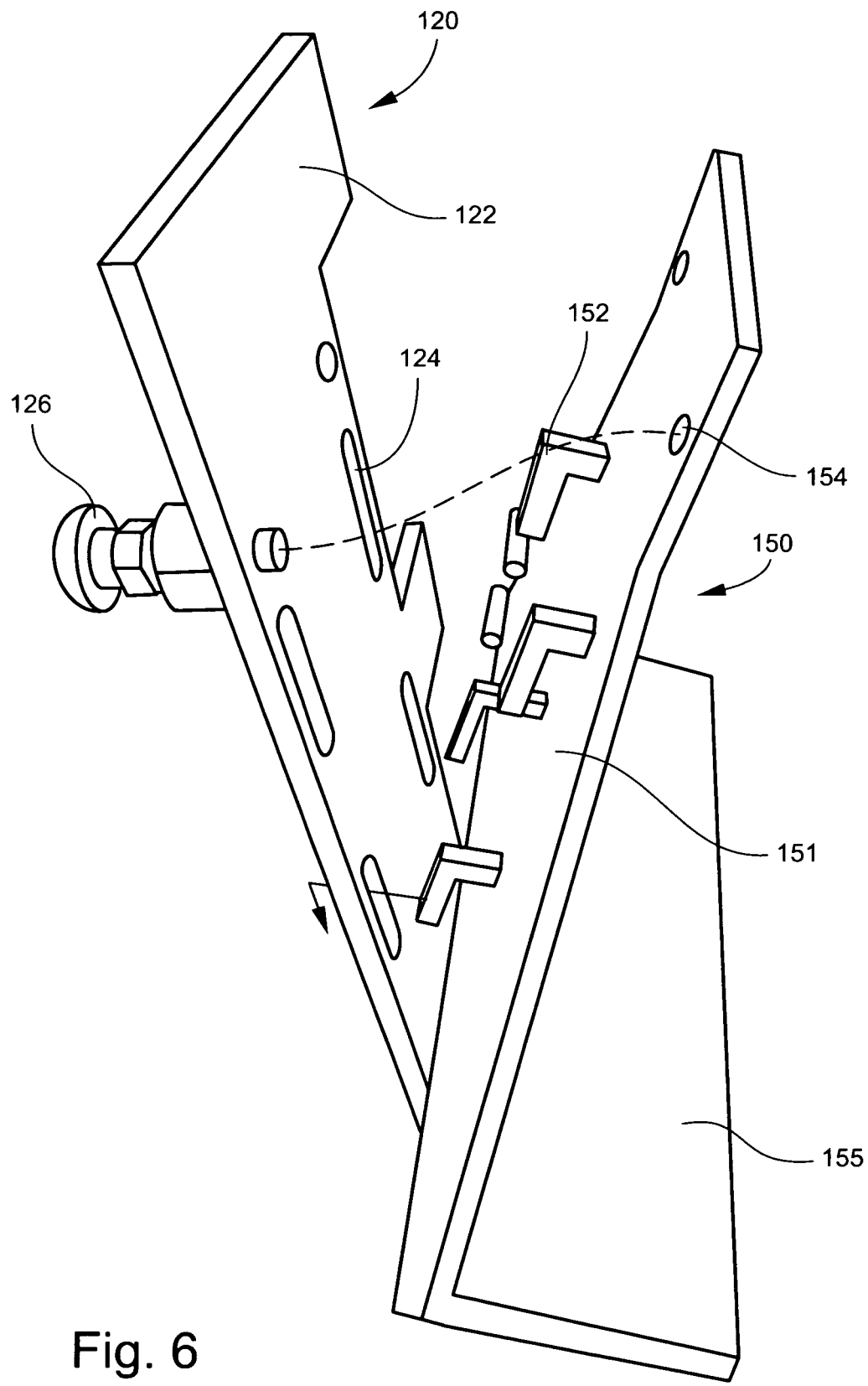
FIG. 6 illustrates the attachment of a first embodiment of the lifting platform for the present invention.
Figure 7:
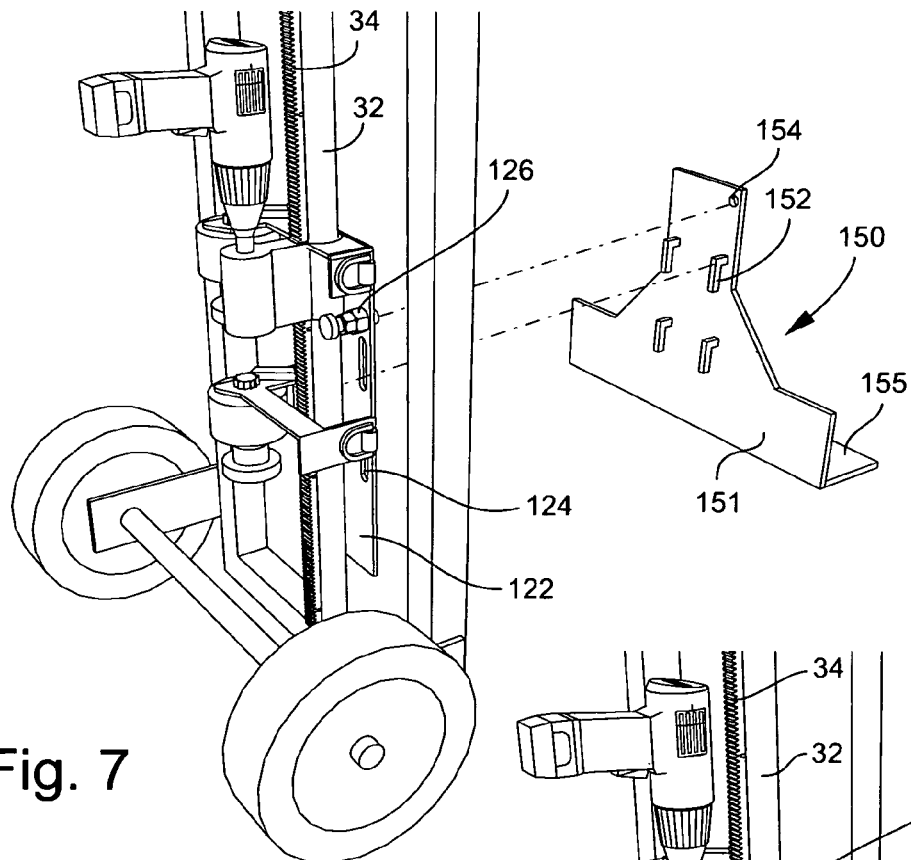
FIG. 7 is an exploded view showing the lifting platform separated from the hand truck of the present invention.
Figure 8:
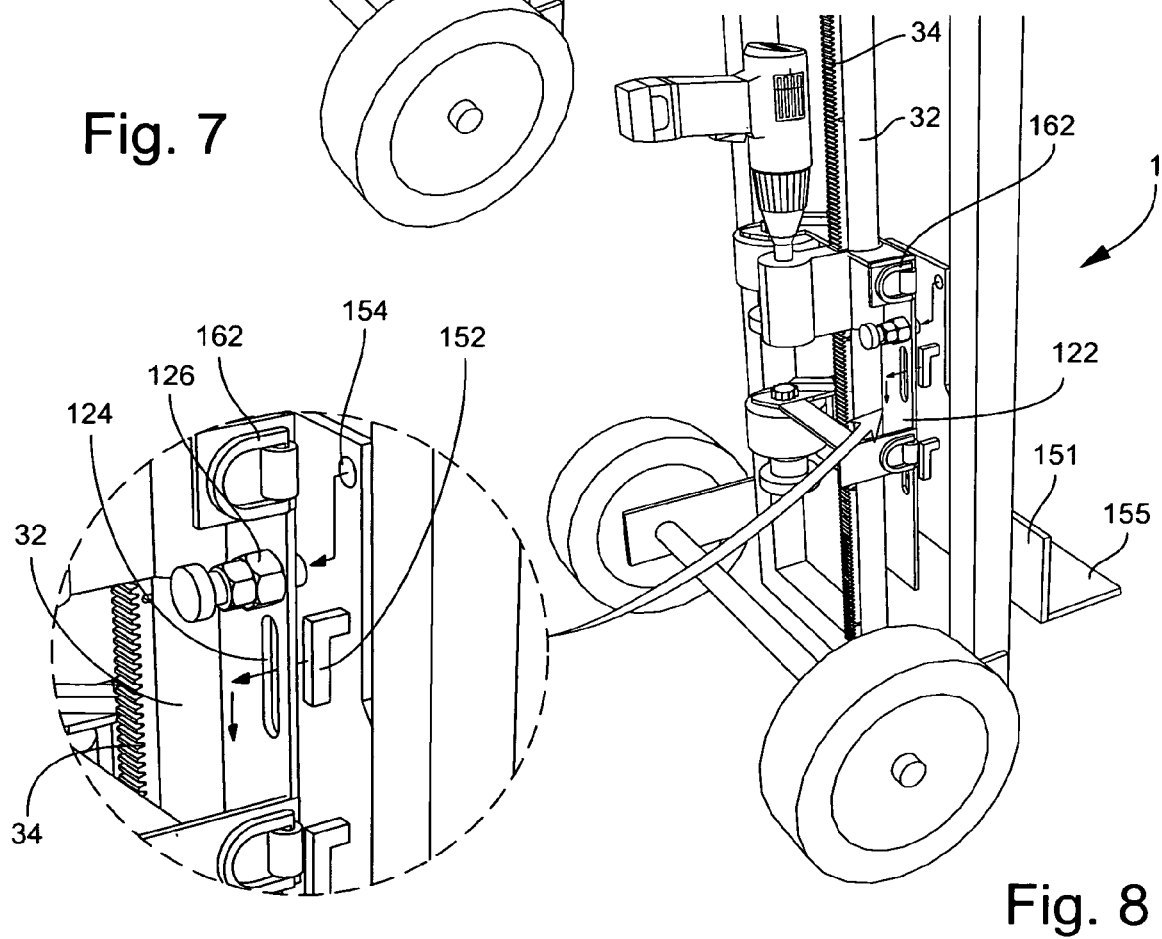
FIG. 8 shows the attachment of the lifting platform to the hand truck of the present invention, the magnification illustrates how various portions of the lifting platform line up with complementary portions lift bracket of the hand truck.
Figure 9:
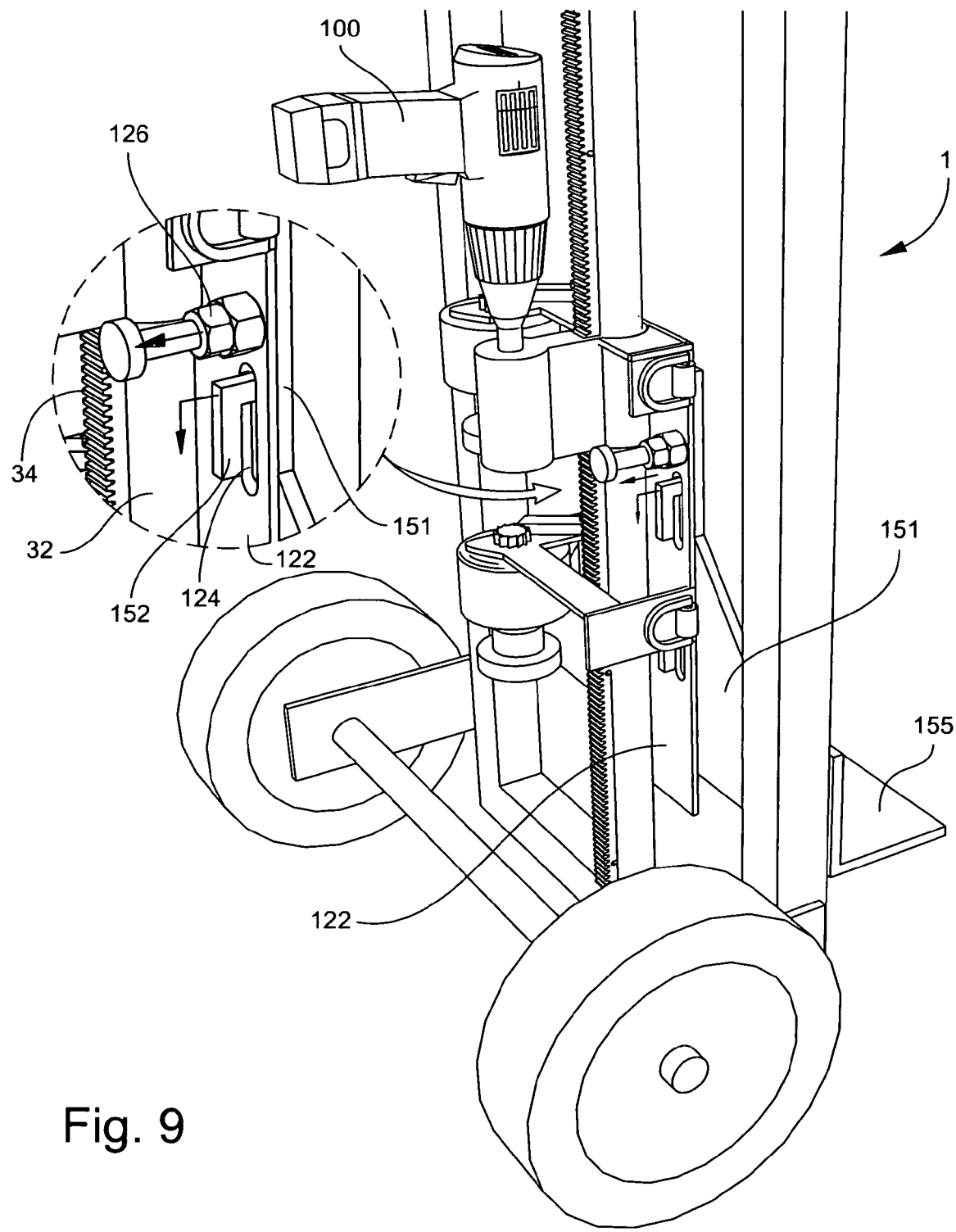
FIG. 9 illustrates the direction of movement of the keys and pop pin of the lift mechanism.
Figure 10:
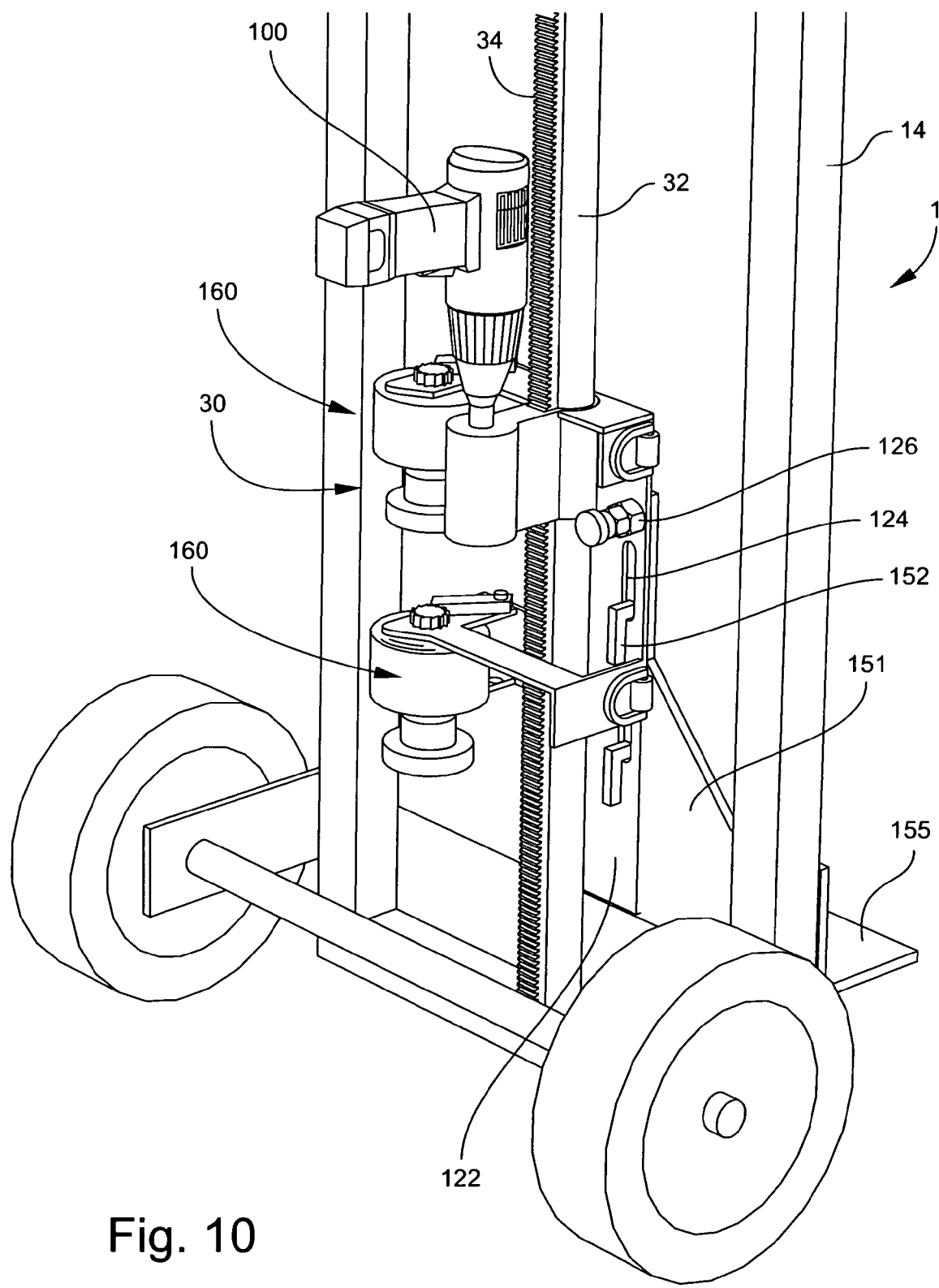
FIG. 10 illustrates a perspective view of the bottom half of a hand truck according to the present invention with a lifting platform attached to the hand truck.
Figure 13:
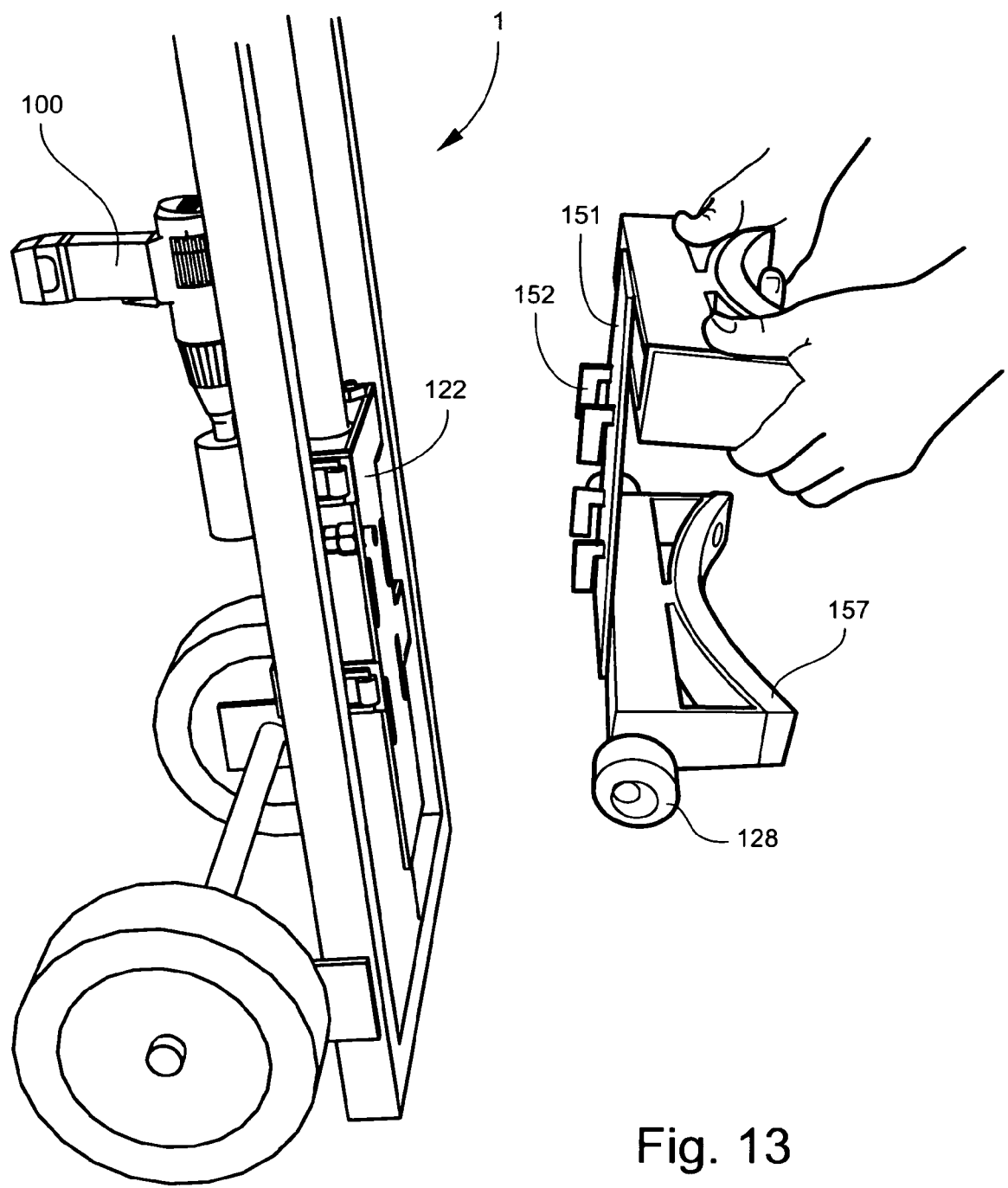
FIG. 13 is a first illustration of the placement of a third embodiment of a lifting platform onto a hand truck according to the present invention.
Figure 14:
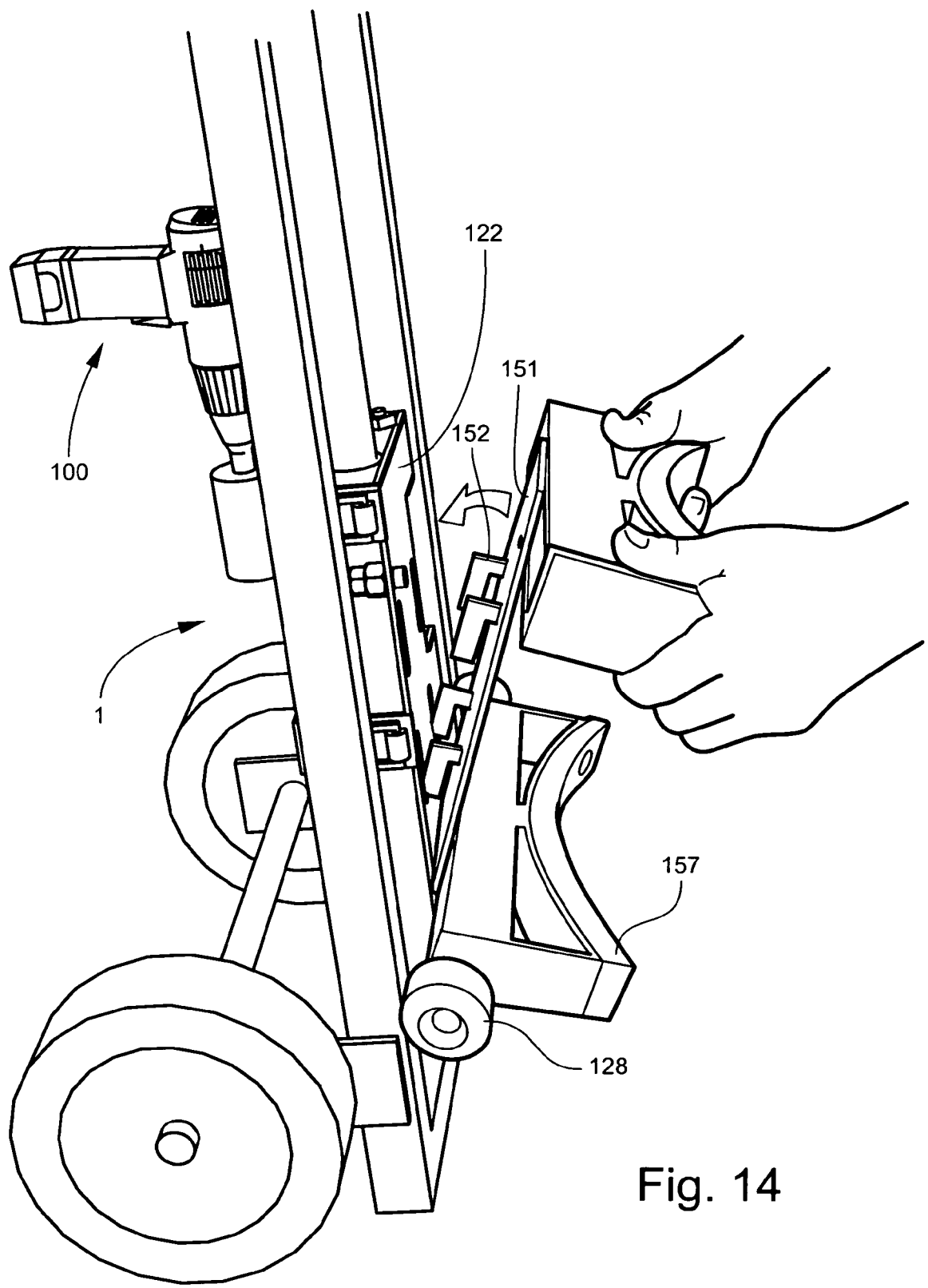
FIG. 14 is a second illustration of the placement of a third embodiment of a lifting platform onto a hand truck according to the present invention.
Figure 15:
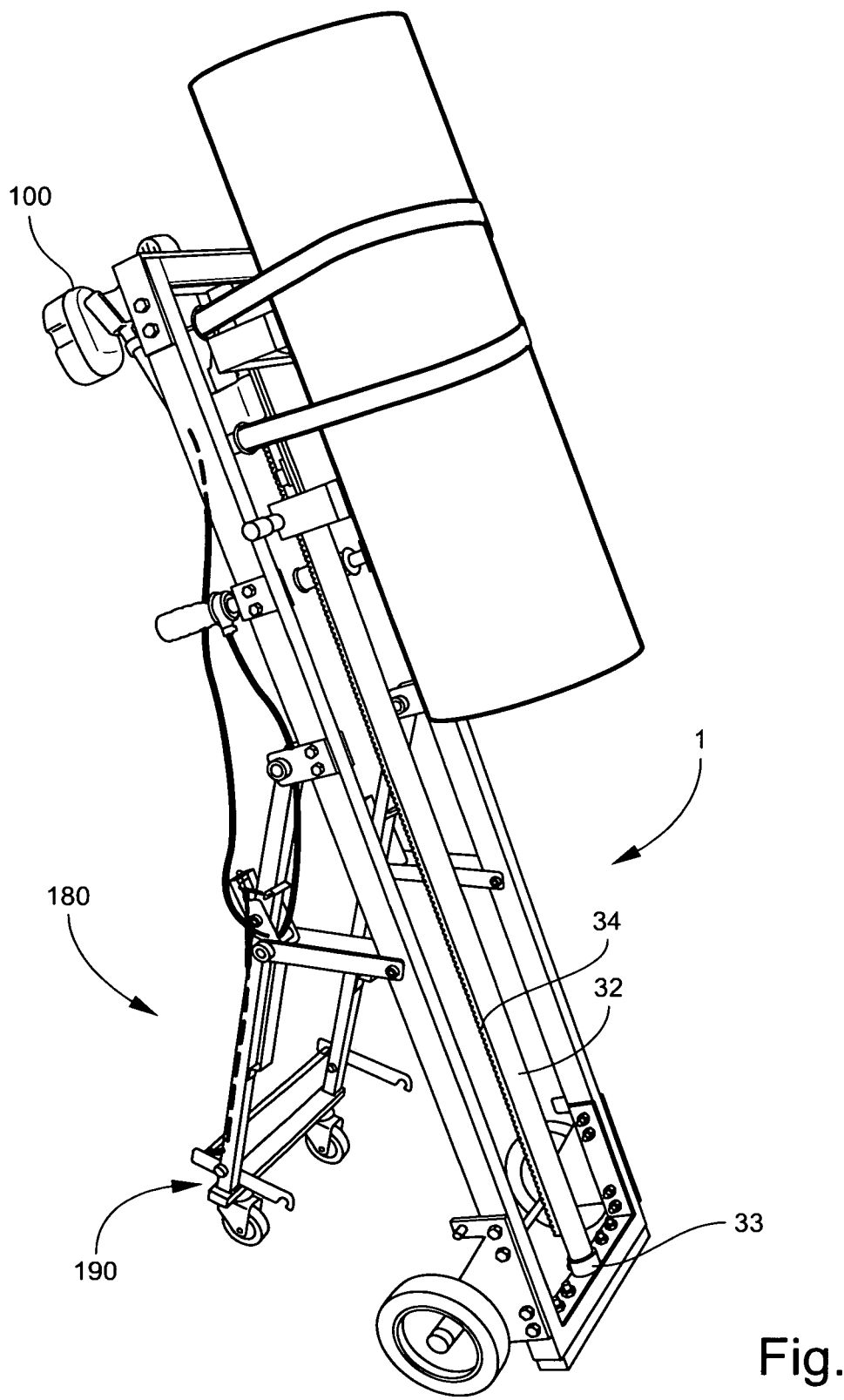
FIG. 15 illustrates the use of the third lifting platform embodiment in lifting a cylindrical object, such as a water heater.
Figure 16:
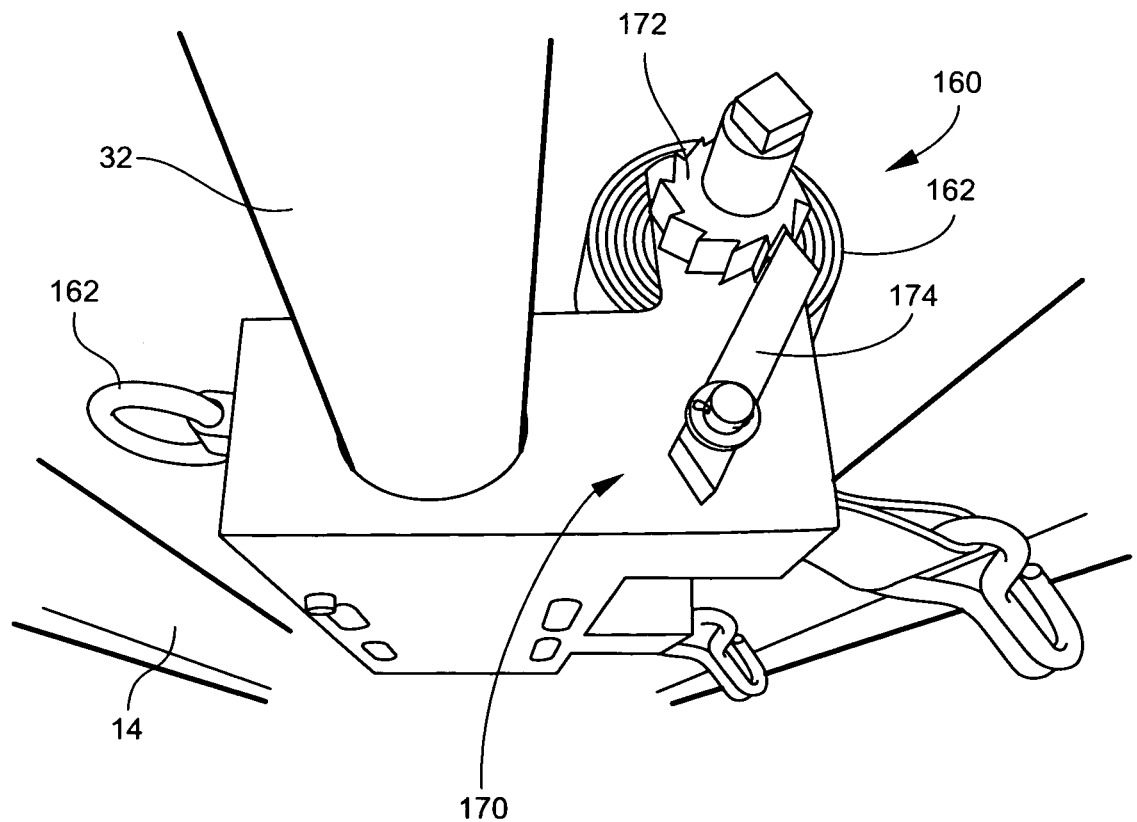
FIG. 16 illustrates a strap locking mechanism for the hand truck according to the present invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect, wireless, or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

While this section of the specification may contain headers, such headers are simply place markers and do not form a part of the specification and are not to be used in the construction of the specification.

While the particulars of the present invention and associated technology may be adapted for use with any type of apparatus for manually transporting items, the examples discussed herein are primarily in the context of a hand truck/dolly structure.

Referring now to the figures, the present invention is a hand truck 1. The hand truck 1 comprises a generally rectangular frame 10 having two short sides 12 and two long side 14. Preferably, the frame 10 is basically constructed from aluminum, however it could be made out of steel, plastic, or the like. In a most preferred embodiment, the generally rectangular frame 10 has square corners with upper and lower frame corner brackets 16 made out of steel to provide additional frame strength.

Located adjacent one of the short sides 12 is a wheel and axle assembly 20 comprising at least two wheel brackets 21 attached to the frame 10, a wheel axel rod 22 rotationally attached to, and extending between, the at least two wheel brackets 21, and at least two wheels 24 attached to opposite ends of the wheel axel rod 22, respectively. Solid or inflated wheels may be used in with the present invention. The preferred wheels are those typical used on hand trucks, dollies, carts and the like.

Located at an intermediate position between the two long sides 14, and extending between the two short sides 12, is a lifting assembly 30.

The lifting assembly 30 preferably comprises a frame center pole rail 32 that has an attached gear rack 34. The frame center pole 32 is preferably a 1" to 1½" galvanized steel pole. The frame center pole 32 is received into an upper and lower receiving 1¾" tube brackets 33, which are mounted to the short legs 12 of the frame 10 in order to securely attach the frame center pole 32 to the frame 10. Preferably, the frame center pole 32 has the metal gear rack 34 welded to a back face of the frame center pole 32, however, alternate attachment means that are common in the arts may be used to attached the gear rack 34 to the center pole 32.

Movably attached to the inner pole rail 32 and attached gear rack 34 is a movable gear box 36 that is drivable along the length of the lifting assembly 30 using an external drive source, such as a portable drill 100 or the like. Preferably, the lifting assembly 30 further comprises an outer pole slide 38 attached to the movable gear box 36 on the opposite side of the inner pole rail 32.

A pinion 42, located in the movable gear box 36, is mounted on a shaft 44 fixed in bushings (not shown) attached to the movable gear box 36. Teeth 48 of pinion 42 mesh with the teeth 35 of the attached gear rack 34. A drive shaft 50 is attached to a worm gear 52 and is mounted in bearings (not shown) fixed respectively in movable gear box 36. Rotation of the drive shaft 50 causes worm gear 52 to drive pinion 42 along the gear rack 34.

In the present invention it is critical that the gear box 36 uses a rack and pinion system in order to prevent unwanted back-drive of the gear box 36 caused by gravity acting on the load. Because there is no unwanted back-drive, the system of the present invention does not require a manual brake or electromagnetic brake in order to keep the load in place once lifted.

In a preferred embodiment, the present invention does not include a drive motor attached to the hand truck 1, as is commonly found in the prior art. The preferred embodiment of the present invention utilizes an external drive motor that is supplied by the user, such as a cordless power drill 100 or the like. A rotating throttle handle controls the portable electric drill trigger by a throttle control cable affixed to portable drill energizing forward or reverse motion to worm gear box module (not shown).

Removable lifting platforms 150 are designed to be removably attached to lift brackets 120 that are attached to the gear box 36. The lift bracket has a receiving plate 122. The receiving plate 122 preferably has at least one, more preferably at least two and most preferably at least four slots 124 to receive a like number of keys 152 from a lifting platform 150.

In a preferred embodiment, the lifting platform 150 comprises a platform plate 151 having the at least one, more preferably at least two and most preferably at least four keys 152 which simple slide into the receiving plate 122 attached to the gear box 36.

In order to keep the lifting platform 150 in place once the keys 152 are inserted into the receiving plate slots 124, a locking mechanism 126, such as a plunger spring loaded slide, passes through both the receiving plate 122 and at least one pin receiving aperture 154 in the platform plate 151 and locks the two together.

In a preferred embodiment, there are straps 160 used to hold lifted objects securely in place. In a preferred embodiment, two ratchet straps 161 are attached to the left side of the hand truck 1 with D-rings 162 for the hooks of the straps 161 to engage to the right side of the hand truck 1.

In a preferred embodiment, there is a strap lock 170 that pivotally locks and unlocks the straps 160. Preferably, located at one end of the strap axis is a toothed/ratchet gear 172. A tang 174 is pivotally attached to an end of the lift bracket 120 near the toothed gear 172 and is rotatably engagable/unengagable with the toothed gear 172. When engaged, the tang 174 locks the toothed gear 172, and consequently the strap 162, into place. When the tang 174 is disengaged from the toothed gear 172, then the strap 162 is free to be wound or unwound.

In a preferred embodiment, there may be upper and lower half moon glide brackets 126 attached to the receiving plate 122. The glide brackets 126 provide upper and lower support to the receiving plate 122 as the gear box 36 is traveling up and down the rail 32.

Located on the back side of the lifting brackets 120 are at least one glide 128 affixed to each outer corner of the bottom of the lifting brackets 120. These glides 128 allow the lifting brackets 120 to remain stable and glide with ease up and down the front of the dolly frame 10. In an alternate embodiment, the glides 128 may be made to rotate by means of a sleeve or a bearing.

In a preferred embodiment, a cordless drill chuck 51 simply slides onto the gear box drive shaft 50. The drill chuck 51 is typically tightened by hand, however square nut, hex head, or keyed head could be attached to the distal end of the drive shaft 50. This would allow the drill to be fastened to the drill with a socket attachment held in the drill chuck 51.

In order to comfortably steer the hand truck 1 according to the present invention, located just above a mid-point in the long sides 14 of the frame 10 are at least one, preferably two handles 60. Preferably, these are adjustably attached to the long sides 14 such that they can be easily placed and locked into place at a comfortable location for the different users.

There are various lifting platforms 150 that may be used with the hand truck 1 of the present invention. First, all of the various embodiments of lifting platforms 150 that are use with the present invention have a platform plate 151 with at least one, more preferably at least two and most preferably at least four keys 152 and at least one pin receiving aperture 154. In a first embodiment of the lifting platform 150, attached at a bottom edge of the platform plate 151 is a lift platform 155. In a second embodiment of the lifting platform 150, attached at a top end and a bottom end of the platform plate 151 is a pair of lift bumpers 156. In a third embodiment of the lifting platform 150, attached at a bottom edge of the platform plate 151 is a pair of lift cradles 157.

In a most preferred embodiment, the hand truck 1 further includes a wheeled kick-out 180. Preferably the kick-out 180 is pivotally attached to about a mid-point of the long sides 14 of the frame 10. More preferably, the kick-out 180 also features a spring biased locking mechanism 190 for locking the kick-out 180 to the axel rod 20 when not in use.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A hand truck for moving heavy or bulky objects comprising:
a frame having two short sides and two long sides;
a wheel and axle assembly attached to the frame;
a lifting assembly located at an intermediate position between the two long sides and extending between the two short sides; said lifting assembly comprising;
a frame center pole rail having a gear rack attached thereto;
a gear box movably attached to the frame center pole rail, said gear box including:
a toothed pinion, located in the movable gear box, mounted on a shaft in the gear box and meshing with the gear rack of the frame center pole rail a worm gear that meshes with the toothed pinion, the worm gear including a drive shaft, wherein rotation of the drive shaft causes the worm gear to drive the pinion along the gear rack;

a lift bracket comprising a receiving plate with at least one slot; and at least one removable lift platform comprising a platform plate with at least one key that are securely receivable into the at least one slot of the lift bracket receiving plate, wherein the removable lift platform further comprises a pair of lift members, with one lift member attached at a top end of the platform plate and the other lift member attached at a bottom end of the platform plate; and an aperture located in the platform plate and a locking mechanism located on the lift bracket receiving plate and receivable by the aperture located in the platform plate.

2. The hand truck according to claim 1 wherein the gearbox is drivable using a power supply supplied by a user.

3. The hand truck according to claim 1 wherein the pair of lift members includes a pair of lift bumpers.

4. The hand truck according to claim 1 wherein the pair of lift members includes a pair of lift cradles.

5. The hand truck according to claim 4 further comprising:

a second removable lift platform comprising a platform plate with at least one key that are securely receivable into the at least one slot of the lift bracket receiving plate, wherein the removable lift platform further comprises a pair of lift bumpers, with one lift bumper attached at a top end of the platform plate and the other lift bumper attached at a bottom end of the platform plate; whereby the hand truck can change between a pair of bumpers and a pair of cradles.

6. A hand truck for moving heavy or bulky objects comprising:

a frame having two short sides and two long sides;

a wheel and axle assembly attached to the frame;

a lifting assembly located at an intermediate position between the two long sides and extending between the two short sides; said lifting assembly comprising;

a frame pole rail having a gear rack attached thereto, a gear box movably attached to the frame pole rail, said gear box including:

a toothed pinion, located in the movable gear box, mounted on a shaft in the gear box and meshing with the gear rack of the frame pole rail a worm gear that meshes with the toothed pinion, said worm gear including a drive shaft, wherein rotation of the drive shaft causes the worm gear to drive the pinion along the gear rack;

a lift bracket comprising a receiving plate with at least one slot and at least one aperture; and at least one removable lift platform comprising a platform plate with at least one key that are securely receivable into the at least one slot of the lift bracket receiving plate and a locking mechanism receivable by the aperture located in the platform plate; wherein the platform plate further includes a pair of lift bumpers attached at a top end and a bottom end of the platform plate;

wherein the gearbox is drivable using a power supply supplied by a user.

7. A hand truck for moving heavy or bulky objects comprising:

a frame having two short sides and two long sides;

a wheel and axle assembly attached to the frame;

a lifting assembly located at an intermediate position between the two long sides and extending between the two short sides; said lifting assembly comprising;

a frame center pole rail having a gear rack attached thereto, a gear box movably attached to the frame center pole rail, said gear box including:

a toothed pinion, located in the movable gear box, mounted on a shaft in the gear box and meshing with the gear rack of the frame pole rail, a worm gear that meshes with the toothed pinion, said worm gear including a drive shaft, wherein rotation of the drive shaft causes the worm gear to drive the pinion along the gear rack;

a lift bracket comprising a receiving plate with at least one slot and at least one aperture; and at least one removable lift platform comprising a platform plate with at least one key that are securely receivable into the at least one slot of the lift bracket receiving plate and a locking mechanism receivable by the aperture located in the platform plate, wherein the removable lift platform further includes a pair of lift cradles attached at a top end and a bottom end of a platform plate;

wherein the gearbox is drivable using a power supply supplied by a user.

* * * * *